(No Model.)
T. F. CRANE.
HAME TUG.
No. 355,389. Patented Jan. 4, 1887.
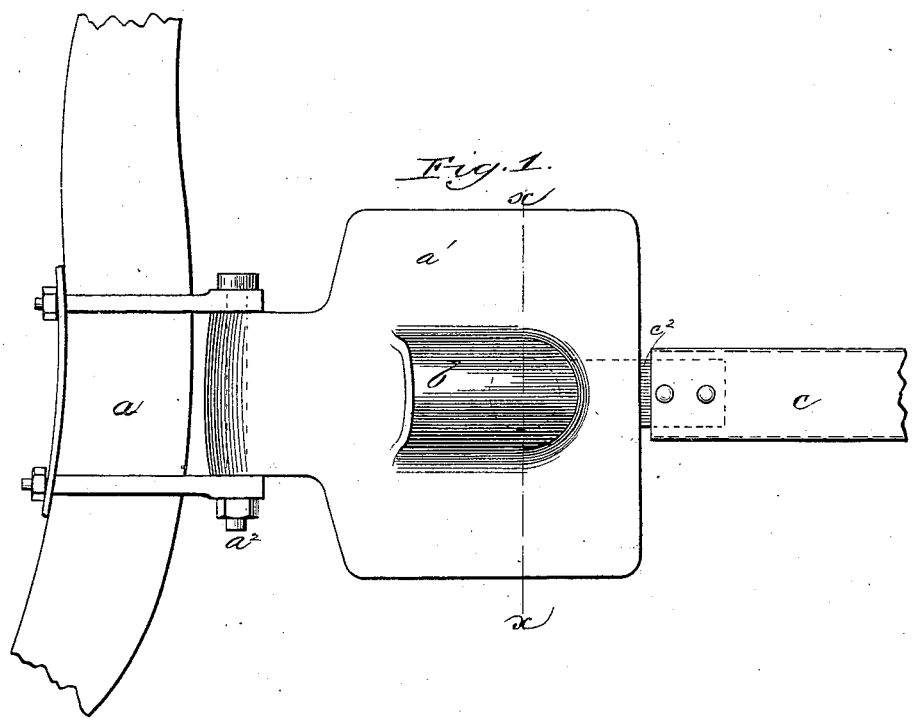
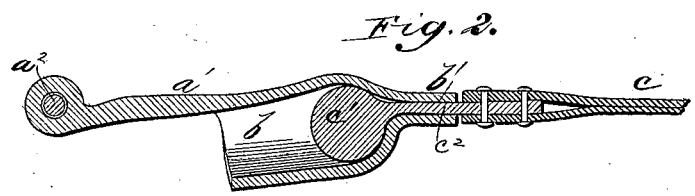
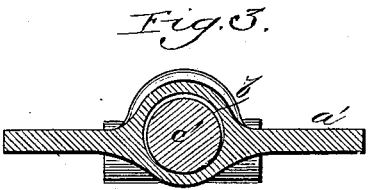
Witnesses,
Inventor,
Theodore F. Crane
By H. Harrison
Atty.

UNITED STATES PATENT OFFICE.

THEODORE F. CRANE, OF RANTOUL, ILLINOIS.

HAME-TUG.

SPECIFICATION forming part of Letters Patent No. 355,389, dated January 4, 1887.

Application filed May 6, 1886. Serial No. 201,283. (No model.)

*To all whom it may concern:*

Be it known that I, THEODORE F. CRANE, a citizen of the United States, residing at Rantoul, in the county of Champaign and State of Illinois, have invented certain new and useful Improvements in Hame-Tugs, of which the following is a specification, to wit:

This invention relates to hame-tugs; and it consists in certain peculiarities of the construction and arrangement of the same, substantially as will be hereinafter more fully set forth and claimed.

In order to enable others skilled in the art to which my invention pertains to make and use the same, I will now proceed to describe its construction and operation, referring to the accompanying drawings, in which—

Figure 1 is a side view of my device; Fig. 2, a longitudinal section, and Fig. 3 a transverse section of the same.

$a$ represents a hame of any suitable construction, such as are in common use in harness. To this hame is hinged the tug-plate $a'$ by means of the pin $a^2$, as represented, and the plate $a'$ is formed with a socket, $b$, open at its forward end, and at its rear end provided with a small slot or similar opening, the use of which will be presently seen.

The trace $c$ is provided with a ball or head, $c'$, connected to the trace end by means of the shank $c^2$, as seen in the drawings.

In use, the shank $c^2$ is passed through the socket $b$ till its ball or head is seated therein, and is then secured to the trace and cannot be disengaged. This forms a strong and durable connection, with just sufficient motion of the ball and shank in the socket to make its use easy and proper, and the broad plate protects the horse from injury or chafing, as will be readily understood, as it distributes the strain and consequent pressure over a greatly-increased area, and is also a stronger and more durable connection.

The device will of course be made of different sizes according to the use for which it is intended, and will be altered in form as may be found desirable without departing from the spirit of my invention.

Having thus fully described my invention, what I claim as new, and desire to secure by Letters Patent, is—

The combination, with a broad plate, $a'$, hinged to the hame and formed with the socket $b$, open at its forward end, and having a small opening at its rear end, of the shank $c^2$, formed with a ball, $c'$, on one end, the whole constructed and arranged for operation substantially as and for the purpose set forth.

In testimony whereof I affix my signature in presence of two witnesses.

THEODORE F. CRANE.

Witnesses:
BENJ. H. SIFFORD,
JAMES E. JONES.